United States Patent
Tsiatsikas (10) Patent No.: US 12,192,389 B2
(45) Date of Patent: Jan. 7, 2025

(54) METHOD AND SYSTEM FOR MULTI-BLOCK MINING BY A SINGLE NODE, IN (A) SINGLE ROUND(S), UNDER DIFFERENT CONSENSUS SCHEMES

(71) Applicant: ATOS Public Safety, LLC, Irving, TX (US)

(72) Inventor: Zisis Tsiatsikas, Salonika (GR)

(73) Assignee: Unify Patente GmbH, Munich (DE)

(*) Notice: Subject to any disclaimer, the term of this patent is extended or adjusted under 35 U.S.C. 154(b) by 211 days.

(21) Appl. No.: 18/080,199

(22) Filed: Dec. 13, 2022

(65) Prior Publication Data
US 2023/0224176 A1    Jul. 13, 2023

(30) Foreign Application Priority Data

Jan. 13, 2022 (EP) .................................. 22151387

(51) Int. Cl.
*G06F 21/00* (2013.01)
*H04L 9/00* (2022.01)
(52) U.S. Cl.
CPC .......... *H04L 9/50* (2022.05); *H04L 2209/463* (2013.01); *H04L 2209/56* (2013.01)

(58) Field of Classification Search
CPC . H04L 9/50; H04L 2209/463; H04L 2209/56; H04L 9/3255; G06F 21/64
See application file for complete search history.

(56) References Cited

U.S. PATENT DOCUMENTS

| | | | |
|---|---|---|---|
| 2019/0238316 A1 | 8/2019 | Padmanabhan | |
| 2020/0026699 A1* | 1/2020 | Zhang | H04L 9/0643 |
| 2020/0044824 A1* | 2/2020 | Xie | G06Q 20/10 |
| 2020/0112443 A1 | 4/2020 | Todd | |
| 2020/0167779 A1 | 5/2020 | Carver et al. | |

OTHER PUBLICATIONS

Extended European Search Report for European Application No. 22151387.2 dated Jul. 6, 2022.

* cited by examiner

*Primary Examiner* — William A Corum, Jr.
(74) *Attorney, Agent, or Firm* — MEAGHER EMANUEL LAKS GOLDBERG & LIAO, LLP (57) ABSTRACT

A method and a system for multi-block mining in at least one single round under different consensus schemes. Embodiments can utilize a concept of sequential multiple block mining in (a) single mining round(s) from a single node. Thereby, the node can separate the transactions based on the context to select the appropriate consensus algorithm in order to use multiple consensus algorithms at the same mining round, one for each block (not one after another in different mining rounds).

15 Claims, 3 Drawing Sheets

METHOD AND SYSTEM FOR MULTI-BLOCK MINING BY A SINGLE NODE, IN (A) SINGLE ROUND(S), UNDER DIFFERENT CONSENSUS SCHEMES

CROSS-REFERENCE TO RELATED APPLICATIONS

The present application claims priority to European Patent Application No. EP 22 151 387.2, filed on Jan. 13, 2022. The entirety of this European Patent application is incorporated by reference herein.

FIELD

The present invention relates to a method and a system for multi-block mining in (a) single round(s), under different consensus schemes. Embodiments can be configured to realize the concept of sequential multiple block mining in (a) single mining round(s) from a single node. Thereby, the node separates the transactions based on the context to select the appropriate consensus algorithm in order to use multiple consensus algorithms at the same mining round, one for each block (not one after another in different mining rounds). Other embodiments can utilize other types of configurations as well.

BACKGROUND

Usually, blockchain networks focus on specific types of transactions. For example, the bitcoin blockchain focuses on financial applications, while a different network may be focused on transactions belonging to network systems of facilities or entities that are part of the critical infrastructure of a region, a state or a country. There is a high interest in keeping these systems running even in times of crisis, extreme large-scale disasters, or other events that can stress such networks.

Critical infrastructure is a term used by governments to describe assets that are essential for the functionality of a society and economy—the infrastructure. Most commonly associated with this term are facilities for shelter, heating (e.g. natural gas, fuel oil, district heating), agriculture, food production and distribution, water supply (e.g. drinking water, waste water/sewage, stemming of surface water (e.g. dikes and sluices), public health (e.g. emergencies, hospitals, ambulances), transportation systems (e.g. fuel supply, railway network, airports, harbors, inland shipping), security services (e.g. police, military), electricity generation, transmission and distribution (e.g. natural gas, fuel oil, coal, nuclear power), renewable energy which is naturally replenished on a human timescale such as sunlight, wind, rain, tides, waves and geothermal heat, telecommunication (e.g. coordination for successful operations). Further, the business or economic sector as well as goods and services and financial services (e.g. banking, clearing) may also be affected by such crises.

SUMMARY

I determined that such facilities and, above all, their networks must not only operate stably and reliably in a crisis situation, but must also observe certain legal, infrastructural or other rules. Mostly or primarily, government organizations or surveillance are directly connected to these institutions or are in close contact with them. Another important point is that information in such networks can be found reliably and promptly in order to provide an appropriate response in crisis situations.

For Example, in emergency ecosystems like Next Generation (NG) 9-1-1 or NG 1-1-2, such systems suffer from inter-connectivity and information sharing issues across different jurisdictions. This happens because a common database (DB) that can store information between Public Safety Answering Points (PSAPs) regarding incident handling does not exist. The issue becomes even more critical when two or more Public Safety Answering Point (PSAP) elements which do not belong to the same jurisdiction receive an emergency request with regards to the same incident. The indication could be related to an emergency call, an abandoned call, or even multiple calls for the same incident which are routed on different PSAP elements, e.g. due to Policy-based Routing Function (PRF) rules. PRF is a functional component of an Emergency Service Routing Proxy (ESRP) that determines the next hop in, for example, a Session Initiation Protocol (SIP) signaling path using a Policy Routing Rule.

Moreover, even if such a mechanism could be in place, a common way to sync the information and preserve the clarity across all PSAPs would be very difficult. This happens mostly due to the fact that all the PSAP elements do not rely on the same vendor. Thus, a unique framework would be beneficial in order to offer a mechanism that will share information among the different PSAP elements regarding incidents.

Blockchain can be suitable for keeping information preserved and trustworthy. However, for blockchain systems that are used within an emergency response system or a critical infrastructure system, it is essential that such systems are both trustworthy and fast.

There are also blockchains with pluggable consensus, which means they can incorporate various consensus mechanisms depending on the goals that need to be achieved. Thus, blockchain networks may exploit different consensus mechanisms during their lifetime according to the debate of the network. For example, it is very common that a blockchain network may start by exploiting the proof of work (PoW) algorithm and then, when a significant amount of cryptocurrency has been mined, they can switch on the proof of stake (PoS), or any other relevant algorithm. This means that it is possible that different blocks are mined across the timeline using different consensus algorithms.

This differentiation creates the problem that based on the existing architectures (public or private), each application (e.g. ledger and nodes), should operate under a different blockchain network, devoted to a specific type of task, exploiting specific consensus algorithms.

Taking this into account, embodiments of my system, apparatus, and process can be configured to refer to transactions which exist at the same time in the blockchain pool but are totally different in terms of context. So, for example, the same blockchain network can be used both by financial users and users which exploit the blockchain to submit transactions related to other aspects, e.g. emergency issues. Any other type of application can also be considered.

The prior art considers blockchain networks which are focused on the mining of blocks of a specific context (e.g. financial etc.). Existing blockchain networks of the state of the art are devoted to specific types of transactions. There are solutions on how it is possible to mine on parallel multiple blocks at the same time, by splitting the transactions in segments. Other sources propose a solution to split the mining work in different nodes in the blockchain, to create motivation in multiple nodes to cooperate in order to solve a block.

Embodiments can be based on the object to provide a method and a corresponding system for parallel multi-block mining under different consensus schemes. For instance, multi-block generation from a single node in one mining round can be provided. As another example, embodiments can be configured so that a node can use multiple consensus algorithms for different blocks in one round. Another object is to pack transactions in relevant blocks based on their context.

It may happen that transactions are different according to their context. These transactions should ideally be handled by different blockchain networks. In the invention at hand different types of transactions were mixed in the same blockchain. Different types of applications can be connected to this type of blockchain network and submit transactions which are different in terms of context. Such blockchain networks that have different transactions based on context have the advantage that transactions which need to be solved quickly in terms of time can be solved with a different consensus algorithm, e.g. proof of authority consensus, than those that need exact verification, e.g. proof of work. The present invention realizes the concept of multiple block mining at the same time, in parallel from a single node. Thereby, the node separates the transactions based on the context to select the appropriate consensus algorithm in order to use multiple consensus algorithms at the same time (not one after another in different mining rounds).

A method for parallel multi-block mining by a single node, in (a) single round(s) under different consensus schemes is provided that can include:

- collecting, by one or more node of a plurality of nodes, in a blockchain network transactions which wait in a mempool (memory pool) and which need to be added to a block in a mining round;
- clustering, by the one or more node, the transactions based on their context;
- searching, by the one or more node, the blockchain to find similar transactions based on the context;
- selecting, by the one or more node, an appropriate consensus algorithm based on the context of similar previous mined transactions;
- creating, by the one or more node, corresponding relations between the blocks with similar previous mined transactions and the transactions to be mined;
- identifying, by the one or more node, the consensus algorithms that were selected for similar previous mined transactions;
- organizing, by the one or more node, the context-related transactions in different blocks and selecting the consensus algorithm for each of these blocks based on the identification in the previous step;
- computing, by the one or more node, a node capacity on how many transactions could be mined in the mining round;
- starting, by the one or more node, the mining round with a first mining process for a first block with a consensus algorithm identified; and
- solving, by the one or more node, the first block.

In terms of the invention, a transaction pool is also named a mempool or a memory pool which is an electronic file or container that contains unconfirmed data about unconfirmed transactions.

Further, according to a preferred embodiment, the node and/or the leader node of the blockchain is one or more of a Public Safety Answering Point element (PSAP) a computer, a server, and/or an element of an entity of critical infrastructure.

It should be appreciated that each PSAP or a PSAP element can be a type of telecommunication device that can include a processor connected to non-transitory computer readable medium (e.g. a non-transitory memory) and at least one transceiver unit. The PSAP and/or PSAP element can also include at least one input device, at least one output device and/or at least one input/output device. Examples of such devices can include touch screens, printers, keyboards, buttons, or pointer devices. The PSAP and/or PSAP element can also each be configured to form communicative connections with other devices (e.g. agent computer devices, cloud service devices, the ESRP, etc.) and the PSAP and/or PSAP element can also be communicatively connectable (e.g. via a network connection, an internet connection, etc.). For example, in some embodiments, the PSAP can directly control and manage a call queue and in other situations the PSAP can be communicatively connected to a call server that may control and manage a call queue.

According to yet another preferred embodiment, the context is any piece of information related to an incident, an image, a video, a sound, a geolocation and/or any other pieces of data.

According to a preferred embodiment, the method further comprises starting in the same mining round, by the one or more node which performed the first mining process, a second mining process for a second block with a consensus algorithm identified; and solving, by the one or more node, the second block.

According to another preferred embodiment, the method further comprises reorganizing, by the one or more node, the transactions which were not included in blocks in the mining round and including these blocks in the mempool or in a buffer or a storage for a future mining round.

According to still another preferred embodiment, the method after the step of searching further comprises selecting, by the one or more node, an appropriate consensus algorithm based on previous mined blocks, in the case no similar previous transactions were found. Next, creating, by the one or more node, corresponding relations between the previous mined blocks and the transactions to be mined. Then, identifying, by the one or more node, the consensus algorithms that were selected for the previous mined blocks and organizing, by the one or more node, the transactions to be mined in different blocks and selecting the consensus algorithm for each of these blocks based on the identification in the previous step and processing the method further with the step of computing the capacity.

Further, according to a preferred embodiment, the method after the step of searching further comprising selecting, by the one or more node, an appropriate consensus algorithm based on the context of the transactions to be mined in the case neither similar previous transactions nor previous mined blocks were found and processing the method further with the step of computing the capacity.

According to yet another preferred embodiment, the method in the step of computing the capacity further comprises organizing, the blocks to be mined according to their capacity consumption, starting from the lowest consumption to the highest consumption block until the capacity of the node is reached.

According to yet another preferred embodiment of the method, the mining process starts with the block to be mined with the lowest consumption of capacity and/or the block which is most critical in terms of time.

According to yet another preferred embodiment, in place of solving the block by the one or more node, the method further comprises receiving, by the one or more node, a success message from another node and stopping the current mining process.

According to yet another preferred embodiment of the method, the mining round comprises of n-mining processes.

According to yet another preferred embodiment of the method, one mining round lasts at least 5 minutes, preferably at least 10 minutes and particularly preferably at least 20 minutes.

According to yet another preferred embodiment of the method, the blockchain comprises at least one virtual chain, wherein at least two blocks of the blockchain are connected to each other based on their context. The present invention relies also on the concept of virtual chains. The correlation between existing and new blocks based on context creates new so-called virtual chains. Virtual chains do not only create links between the different blocks based on the related transactions, but here blocks which consist only of the selected transactions which belong on the same context (application-related) are created. All of the transactions related to the same context will use the same consensus algorithm to get mined as if it was done by separate blockchain networks. By linking these virtual chains in a new mining round, again based on context, thus a large number of virtual chains can be created which exist alongside the actual blockchain. Special analyses, e.g. of the capacity of various parameters of the nodes, can thus be carried out more efficiently and in a shorter time with less effort. Tasks or other events that would otherwise be processed or executed in parallel can also be uncovered and bundled or effectively assigned to one unit. By incorporating the blockchain architecture, each node will need to report in every mining round the new context which is handled by this node. All the other nodes will remain updated about the context which is handled by each node. By using virtual chains, it is possible to create links between the different context which may not be positioned in adjacent blocks. The invention offers a model that can be used, for example, in an emergency context as well as in any other context. In essence, multiple other embedded context-based chains are formed using only one existing blockchain.

According to yet another preferred embodiment of the method, the consensus algorithm is one or more of proof of authority (PoAuth), proof of stake (PoS), delegated proof of stake (DPoS), leased proof of stake (LPoS), proof of elapsed time (PoET), practical Byzantine fault tolerance (PBFT), simplified Byzantine fault tolerance (SBFT), delegated Byzantine fault tolerance (DBFT), directed acyclic graphs (DAG), proof of activity (PoA), proof of importance (PoI), proof of capacity (PoC), proof of burn (PoB), multi-signature (multisig) and/or proof of weight (PoWeight).

In the direction of achieving a fast block creation, the avoidance of a proof of work (PoW) consensus algorithm is considered a sine qua non. Especially in the case of a permissioned blockchain, e.g. a private blockchain that is not public but that is only shared among specific entities (e.g., among PSAP elements), it is considered mandatory to avoid PoW. For this reason, in the context of this proposal, we consider that the nodes operate using the proof of authority (PoAuth) consensus algorithm.

In PoAuth, rights to generate new blocks are awarded to nodes that have proven their authority to do so. These nodes run software allowing them to put transactions in blocks. PoAuth is suited for both private networks and public networks where trust is distributed. The PoAuth consensus algorithm leverages the value of identities which means that block validators are not staking coins but their own reputation instead. PoAuth is secured by trust on the identities selected. The PoAuth algorithm offers an increased rate of block creation. All nodes in the blockchain are given a specific interval on which they become the leader nodes and it is possible to generate new blocks. However, any other similar consensus algorithm can be exploited for the same reason.

In proof of stake (PoS), blockchain consensus models' transactions are secured by users of the blockchain network who play the role of validators. To validate transactions, validators must hold a certain percentage of the network's total value. This concept leads to a reduced usage of system & hardware resources. Proof of stake might also provide increased protection from malicious attacks on the network by making it very expensive to execute attacks, and therefore, reducing the incentive for those attacks.

While PoW and PoS consensus are used in the majority of today's blockchain networks, there are also many other models of the consensus mechanism having the same ultimate goal—maintain the security and operation of a decentralized platform and allow blockchain users to come to an agreement in block creation. Below are just a few of the modern implementations of decentralized consensus:

(a) Delegated proof of stake (DPoS): DPoS is a high-speed consensus model, most known for its first implementation in the cryptocurrency EOS blockchain. Delegated proof of stake mechanism is a type of consensus where users can stake their coins to participate in voting for a number of delegates. The weight of a user's vote depends on the stake. Delegates that have received the highest number of votes are allowed to take part in block creation and get rewarded for creating these blocks.

(b) Multi-signature (multisig): multisig is a model where most validators on the blockchain network (for instance 7 out of 10) must agree that a transaction is valid.

(c) Proof Of capacity (PoC): PoC is a model where consensus is achieved via a process called plotting. Instead of using computational power to create solutions, they are pre-stored in digital storages. The owner of the fastest solution to the puzzle gets to create the new block. Users who have the most storage capacity on the blockchain have the highest odds of creating a new block.

(d) Practical Byzantine fault tolerance (PBFT): PBFT is an algorithm designed to settle disputes among computing nodes (blockchain network participants) when one node in a set of nodes generates different output from the others in the set.

There are also blockchains with pluggable consensus, which means they can incorporate various consensus mechanisms depending on the goals that need to be achieved. In the sense of the invention, it is also possible to use a hybrid consensus, e.g. two or more consensuses that run in parallel and that can even influence each other.

A corresponding system for parallel multi-block mining by a single node, in (a) single round(s) under different consensus schemes is also provided, wherein the system is configured to perform one or more steps of the method for parallel multi-block mining under different consensus schemes.

According to a preferred embodiment, the system comprises:
a plurality of nodes connected to each other within the blockchain network, one or more node capable to perform the block generating process,
one or more transaction,
a chain of blocks in a specific order,
one or more consensus algorithm,
one or more validator node,
a blockchain ecosystem.

A blockchain ecosystem constitutes a service overlay network and to be a node in the network, a computer must be able to process application-specific messages, must comply with the rules of the network and/or applied consensus and affect the shared state of the network. Such an ecosystem may comprise a system management which provides the ability to create, change and monitor blockchain components. A consensus algorithm is a set of rules and arrangements to carry out blockchain operations. A transaction is the smallest building data block of the blockchain system.

According to another preferred embodiment, the system further comprises one or more virtual chain which is chained based on its context and is encapsulated in the chain.

Some embodiments of the system can include one or more PSAPs or PSAP elements. Also, there can be at least one ESRP. Each ESRP can be a computer device that includes a processor connected to non-transitory computer readable medium (e.g. a non-transitory memory) and at least one transceiver unit. The ESRP can also include at least one input device, at least one output device and/or at least one input/output device. Examples of such devices can include touch screens, printers, keyboards, buttons, or pointer devices. The ESRP can also be configured to form communicative connections with other devices (e.g. agent computer devices, cloud service devices, the PSAP, a cloud server, etc.). For instance, the ESRP can be communicatively connectable to one or more PSAPs and/or other Emergency Services IP Network (ESInet) elements via a network connection, an internet connection, etc.

According to yet another aspect of the present invention, a program element is provided that can be stored in non-transtory memory or other type of non-transitory computer readable medium in which when being executed by a processor of a device is adapted to carry out steps of the method for parallel multi-block mining under different consensus schemes.

According to another aspect of the present invention, a non-transitory computer-readable medium comprising program code is provided which when being executed by a processor is adapted to carry out steps of the method for parallel multi-block mining under different consensus schemes.

A computer-readable medium may be, for example, a floppy disk, a hard disk, an USB (Universal Serial Bus) storage device, a RAM (Random Access Memory), a ROM (Read Only Memory) or an EPROM (Erasable Programmable Read Only Memory). A computer readable medium may also be a data communication network, e.g. the Internet, which may allow downloading a program code.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of a subject-matter also any combination between features relating to different types of subject-matters is considered to be disclosed with this text.

In particular, combinations between features relating to the apparatus type claims and features relating to the method type claims are considered to be disclosed. The invention and embodiments thereof will be described below in further detail in connection with the drawing(s).

It should therefore be appreciated that other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawing include:
Node 1 blockchain network Node 1
Node k blockchain network Node k
Trans1001 Transaction Nr. 1001
Trans1002 Transaction Nr. 1002
Trans*Transaction Nr. *, wherein * is a random number
PoW Proof of Work consensus algorithm
PoA Proof of Activity consensus algorithm
PoS Proof of Stake consensus algorithm
PrevHash Previous Hash (Hashmark for a previous mined block)
S1-S13 Steps S1 to S13 of a method

DETAILED DESCRIPTION

Figure 1:
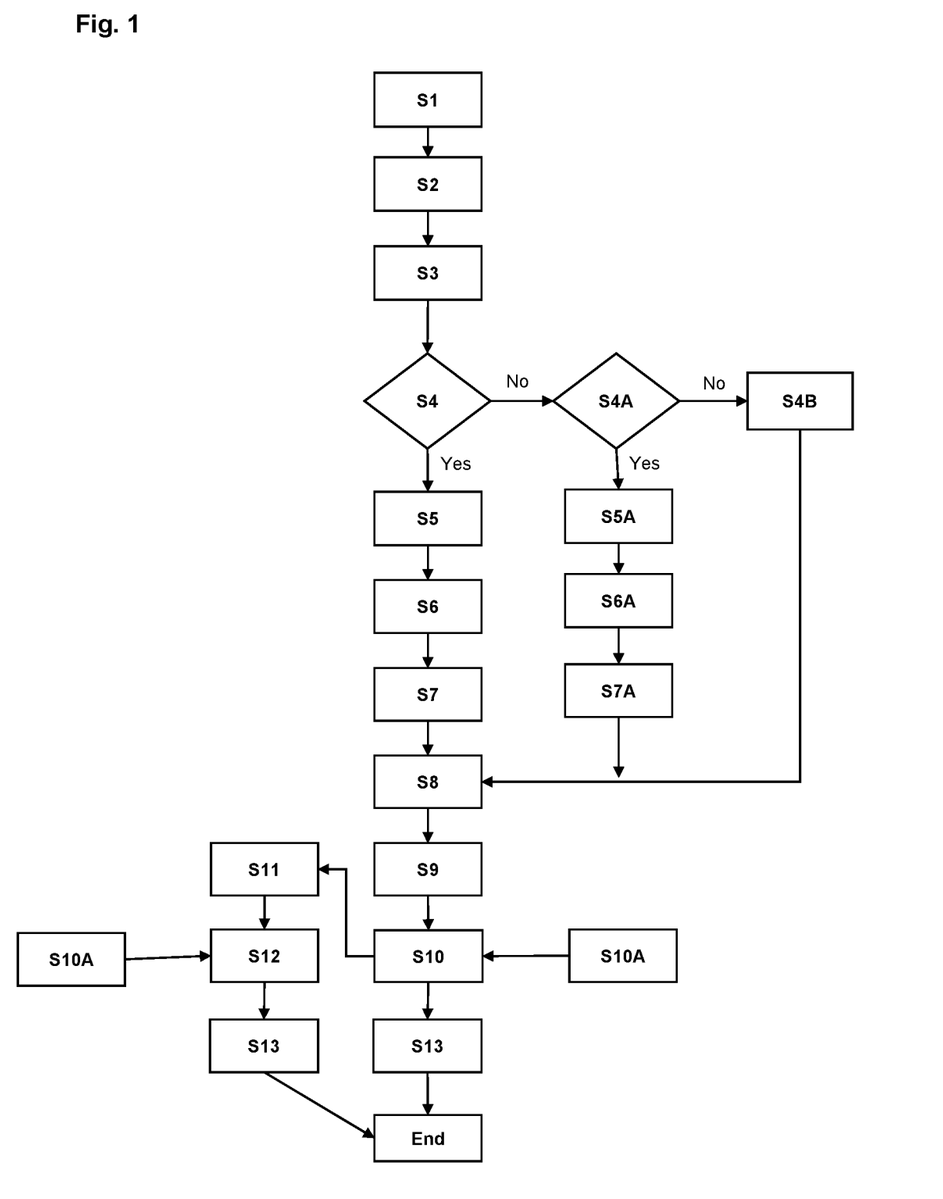
FIG. 1 is a flowchart of method steps according to an embodiment of the invention.

In FIG. 1 the method steps according to an embodiment of the invention are depicted. As can be seen in step S1 every node in the network collects the transactions which need to be added to the next block for mining and wait in the transaction pool. In terms of the invention, a transaction pool is also named a mempool or a memory pool which is an electronic file or container which contains unconfirmed data about unconfirmed transactions.

Then in step S2, a separation of the transactions based on their context takes place. In the next step S3, a search is performed in the blockchain in order to find similar transactions based on the context. Similarity can be determined based on a pre-selected similarity criteria for the previously mined transactions for identification of similar transactions based on the context of the transactions that can be identified from the blocks for the previously mined transactions. The similarity criteria can include one or more parameters about transaction context, for example. In the step S4, it is checked if transactions are found.

If no relevant previous transactions in the blockchain are found, the method checks for previous mined blocks in step S4A.

If previous mined blocks are found, then in step S5A, corresponding relations between the previous mined blocks and the transactions to be mined are created. The method then proceeds with the step S6A where the one or more node identifies the consensus algorithms that were selected for the previous mined blocks and then, in step S7A, organizing, by the one or more node, the transactions to be mined in different blocks and selecting the consensus algorithm for each of these blocks based on the identification in the previous step and processing the method further with the step S8 and computing the capacity of the node.

Otherwise, in step S4B, in the case no historic information of previous mined blocks is available (e.g. in the first mining round), the node picks the most appropriate consensus algorithm based only on the context of the transactions to be mined. And then the method proceeds with step S8, however, the node capacity is computed based on only the information of consensus algorithm picked in step S4B.

In the case relevant transactions exist in step S4, the method proceeds with step S5. In this step, the corresponding relations between the blocks and the transactions are created. Then in the next step S6, based on the relations with past existing blocks and following the virtual blockchains, the different consensus algorithms are identified and selected with which the past existing blocks were solved or mined along the virtual blockchain. In step S7, the nodes organize the context-related transactions in different blocks and select the consensus algorithm for each block according to the findings from step S6.

In step S8, the node capacity is computed on how many transactions could be mined in parallel based on the setup, which was done in one of the steps S7, S7A or S4B. Further, the blocks to be mined may be organized according to their capacity consumption starting from the lowest consumption to the highest consumption block until the capacity of the node is reached.

Then in step S9 the node starts a mining process. How many mining processes can be performed in one round by the same node depends on the capacity of the node and/or on the complexity or difficulty of the mining process itself, e.g. which consensus algorithm is used, etc.

In the next step S10 the current node solves the block of this mining process. If the node finishes the first mining process, then in step S11, it can start a second mining process for a second block with same or different consensus algorithm, if it is enough time remaining in this mining round. In principle, the same node can mine or solve as many blocks as time and capacity is available in the current mining round. Finally, in step S12, the node solves the second block.

In any case, the upper limit of the remaining time for each round is bounded by the average time of the solution on the most difficult block. For example, if based on the transactions which exist on the mempool, in the beginning of a mining round, there are two types of blocks which can be formed based on the transaction context, the first one that requires PoA and a second one that requires PoW, the maximum time for this round would be avgMiningTime(PoA)+avgMiningTime(PoW). Where the avgMiningTime indicates the average time which is required by a node to mine a block using a specific consensus algorithm.

If a node solves the first block using the PoA consensus in time less or equal to the avgMiningTime(PoA), then it can try to solve also the second block, because the remaining time is enough. If the node does not wish to try for the second block, it will announce the first block to the network, and the second block will be mined by another node. In any case, all the nodes are aware that they must solve as many blocks as can be formed by the transactions which exist on the mempool of every node, after the last successful mining process has finished. This infers the average time period that will be needed by the nodes to solve the new blocks (e.g., how long the new mining round will last).

In step S13 the node reorganizes the transactions which were not included in blocks in this round to get included in future blocks. Therefore, the node can temporarily keep these transactions in its mempool, in a buffer or a storage to add them in the next mining round.

Further, in place of solving the current mining process by itself, the node in step S10A may receive a success message from another node. In this case, the node stops the current mining process and may proceed with another one if time is left in this mining round. But this means that the second or the n-th block, it will need to use the hash value of the announced block.

It should be appreciated that each node can be a type of telecommunication device that can include a processor connected to non-transitory computer readable medium (e.g. a non-transitory memory) and at least one transceiver unit. The node can also include at least one input device, at least one output device and/or at least one input/output device. Examples of such devices can include touch screens, printers, keyboards, buttons, or pointer devices. The node can also be configured to form communicative connections with other devices (e.g. agent computer devices, cloud service devices, an ESRP, at least one PSAP, etc.) and the node can also be communicatively connectable (e.g. via a network connection, an internet connection, etc.) to other devices.

Figure 2:
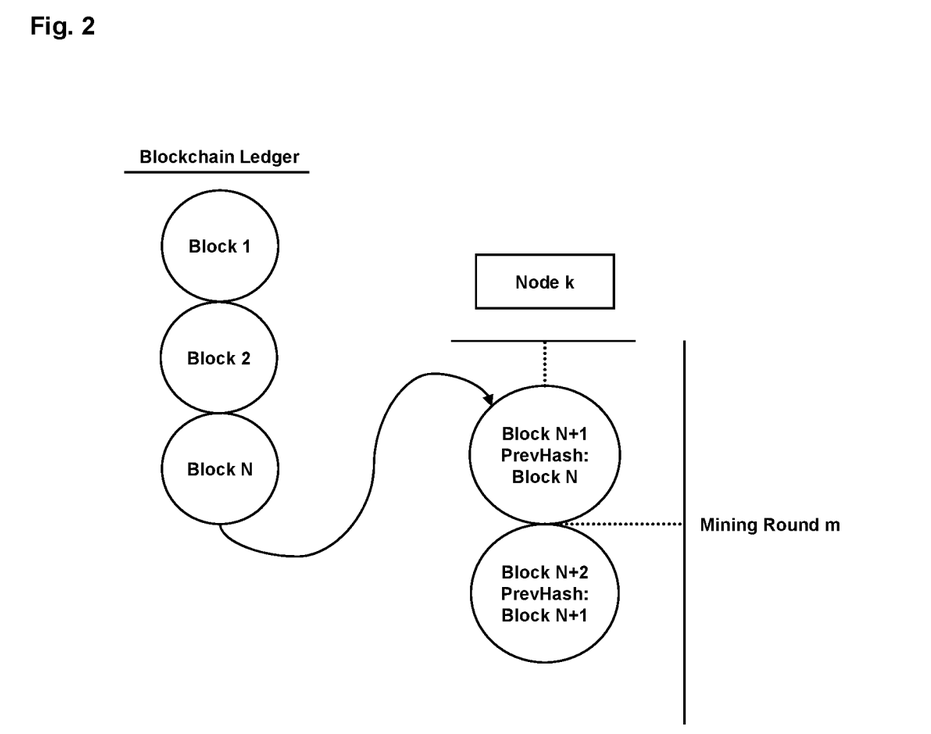
FIG. 2 is a flow chart schematically illustrating an overview of the concept of parallel mining using different consensus algorithms for different blocks according to another embodiment of the invention.

FIG. 2 shows a schematically overview of the concept of parallel mining using different consensus algorithms for Block N+1 and Block N+2. Usually, blockchain networks mine only one block per mining round. In this embodiment, it is described to mine more than one block, using different consensus algorithms. Assumed, for example, that one block, namely Block 1, is related to emergency incidents and thus the proof of authority (PoAuth) consensus algorithm can be used, while another one, namely Block 2, is related to financial transactions and the proof of work (PoW) consensus algorithm must be used.

Obviously, those two consensus algorithms have a totally different efficiency in terms of elapsed time. The PoAuth consensus algorithm is far faster than the algorithm of PoW. This means that if a node somehow was assigned the task to mine both blocks, the method according to this embodiment is designed to go first for Block 1 in a mining perspective and then for Block 2. This is because Block 1 is very fast to be done and probably far more critical in terms of time. This could not work if we had two blocks with the same consensus algorithm, say the PoW algorithm, due to the limit of the usually 10 minutes interval per mining round. Still, when there are different consensus algorithms per block, such a scenario is possible. To get this issue solved, it can be necessary to pack the transactions in different blocks per context, and then apply all the n-mining procedures. Thereby, starting from the most lightweight one to the most difficult until the capacity of the node is reached.

In FIG. 2 Node k prepares and mines both Block N+1 and N+2 at the same mining round m, using the necessary hash relations by exploiting different consensus algorithms. After solving the puzzles, the blocks can be added in the blockchain ledger, after Block N.

Figure 3:
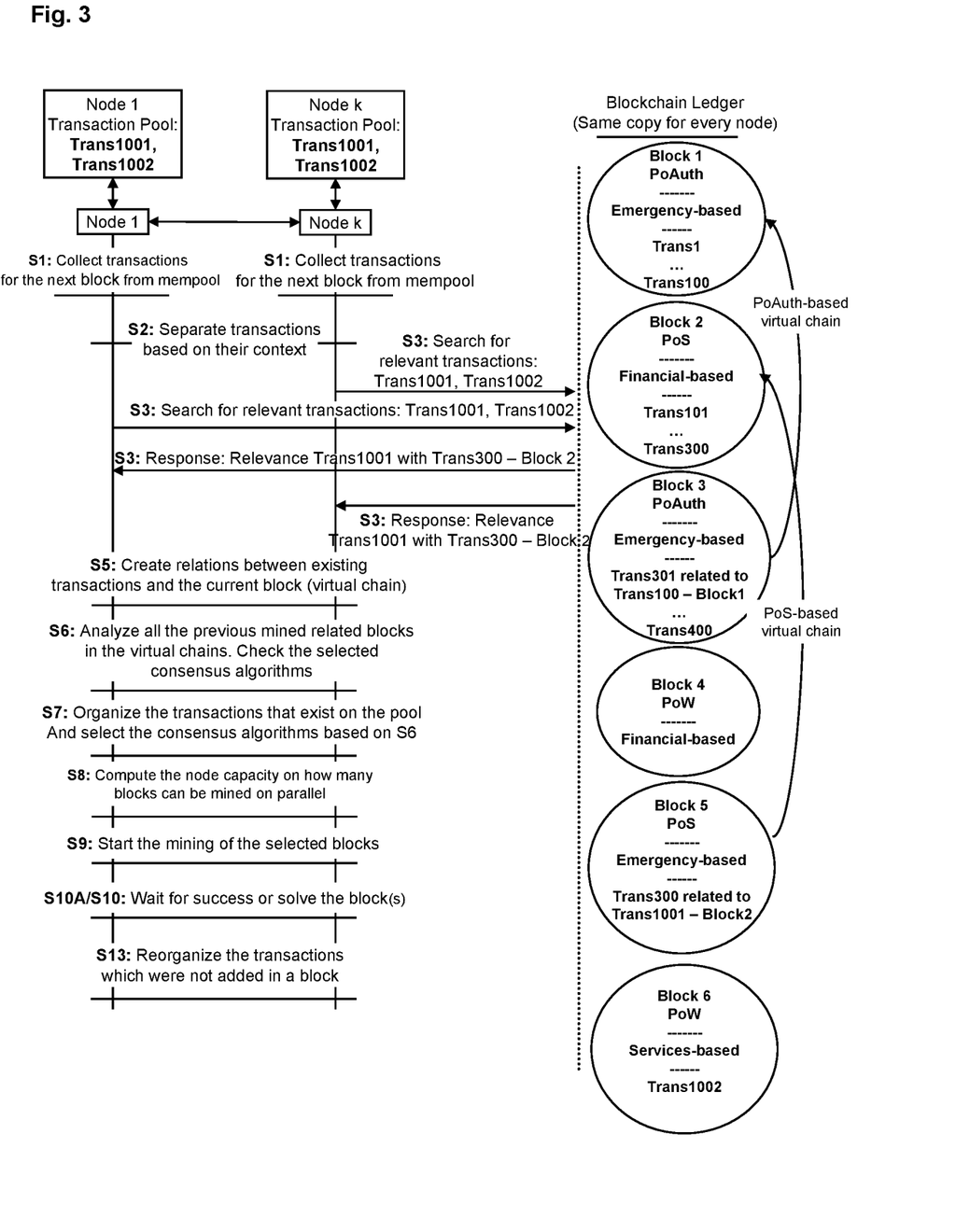
FIG. 3 is a flow chart schematically illustrating an overview of an architecture of a blockchain according to another embodiment of the invention.

FIG. 3 shows a schematically overview of an architecture of a blockchain that can be utilized in an embodiment of the process, system and/or device. A single blockchain network can be assumed on which the nodes support multiple different consensus schemes, and various types of transactions. All the nodes support all these transactions and thus they can mine using specific consensus schemes per context without the need to communicate the selection of a new consensus algorithm to the rest of the nodes. The blockchain according to the embodiment of FIG. 3, uses different steps of the proposed method. Additionally, in this embodiment, the Node 1 and Node k are described, but the method can be applied in any number of nodes.

In step S1, both nodes, Node 1 and Node k select transactions that will be included in the next mined block. It is considered that the method is triggered the next time a new round for mining is initiated.

In step S2, the two nodes separate the transactions based on their context. Say, for example, that in their mempool, the two nodes have only two transactions during this mining round, namely as Trans1001 and Trans1002.

In step S3, both two nodes ping the Blockchain Ledger to retrieve transactions and correlate them with Trans1001 and Trans1002. As soon as the nodes receive the responses, they identify that there is a correlation between Trans1001 and Trans300 which is included in Block 2.

In step S5, the corresponding relation between Block 5 and Block 2 is created. So, Block 5 now contains Trans1001 and any other number of related transactions. In step S6, it is identified that Block 2 was mined by exploiting the PoS consensus algorithm. For this reason, in step S7, the same consensus algorithm is selected for Block 5 and, additionally in this step, it is selected that Trans1002 will be added in a next block, namely as Block 6. Keeping in mind that in the scenario of this embodiment it is assumed that these two blocks contain only one transaction, but any number of transactions could be supported up to the max level of each block.

For Block 6 the PoW consensus algorithm is selected based on the context of the packed transaction(s), e.g. Trans1002.

Then in step S8, both nodes check the instant capacity of the node in order to identify if the node can calculate both Block 5 and Block 6. It is assumed that all of the nodes which participate in the network fulfill the requirements of supporting parallel mining and they also support multiple consensus algorithms. Thus, the hardware should be similar. Under these assumptions, the capacity of the nodes in every mining round should be preserved intact.

Both nodes check in step S8 that their capacity is capable to mine both blocks (Block 5 and Block 6) based on the PoS and PoW consensus algorithms respectively. In step S9, they start the mining process trying to solve both blocks.

Eventually, when one of the n-nodes solves both the blocks it will send a message to the rest of the network that it has finished successfully. Thus, then the other nodes will be in position to verify the blocks. In step S10 of FIG. 3, Node 1 announces that it successfully found a solution for both of Block 5 and Block 6. This message is also conveyed to Node k for verification in step S10/S10A. In the last step S13 the nodes reorganize possible transactions which were not included in the blocks.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, node, blockchain, and methods of making and using the same have been shown and described above, it is to be distinctly understood that the invention is not limited thereto but may be otherwise variously embodied and practiced within the scope of the following claims.

What is claimed is:

1. A method for parallel multi-block mining by a single node, in a single round under different consensus schemes, wherein the method comprising the steps of:
   collecting, by one or more node of a plurality of nodes, in a blockchain network transactions which wait in a mempool or memory pool, and which need to be added to a block in a mining round;
   clustering, by the one or more node, the transactions to be mined based on their context in one or more cluster of context-related translations;
   searching, by the one or more node, the blockchain to find similar transactions based on the context;
   selecting, by the one or more node, an appropriate consensus algorithm based on the context of similar previous mined transactions, wherein the similar previous mined transactions are transactions that meet a pre-selected criteria of similarity for the previous mined transactions;
   creating, by the one or more node, corresponding relations between the blocks with similar previous mined transactions and the one or more cluster of context-related transactions to be mined;
   identifying, by the one or more node, the consensus algorithms that were selected for similar previous mined transactions;
   organizing, by the one or more node, the context-related transactions to be mined in different blocks, one of said blocks comprising one or more cluster and selecting the consensus algorithm for each of these blocks based on the identification in the previous step;
   computing, by the one or more node, a node capacity on how many blocks of said different blocks could be mined in the mining round based on the different blocks and their selected consensus algorithm;
   starting, by the one or more node, the mining round with a first mining process for a first of said different blocks with the consensus algorithm selected for said first block; and
   solving, by the one or more node, the first block.

2. The method according to claim 1, comprising:
   starting in the same mining round, by the one or more node which performed the first mining process, a second mining process for a second block with a consensus algorithm identified; and
   solving, by the one or more node, the second block.

3. The method of claim 2, comprising:
   reorganizing, by the one or more node, the transactions which were not included in blocks in the mining round and including these blocks in the mempool or memory pool, for a future mining round.

4. The method of claim 1, the method also comprising:
after the searching, by the one or more node, the blockchain to find similar transactions based on the context:
selecting, by the one or more node, an appropriate consensus algorithm based on previous mined blocks, in the case no similar previous transactions were found;
creating, by the one or more node, corresponding relations between the previous mined blocks and the transactions to be mined;
identifying, by the one or more node, the consensus algorithms that were selected for the previous mined blocks;
organizing, by the one or more node, the transactions to be mined in different blocks and selecting the consensus algorithm for each of these blocks based on the identification in the previous step and processing the method further with the computing, by the one or more node, the node capacity on how many transactions could be mined in the mining round.

5. The method of claim 1, comprising:
after the searching, by the one or more node, the blockchain to find similar transactions based on the context:
selecting, by the one or more node, an appropriate consensus algorithm based on the context of the transactions to be mined in the case neither similar previous transactions nor previous mined blocks were found and processing the method further with step S8.

6. The method of claim 1, wherein the computing, by the one or more node, the node capacity on how many transactions could be mined in the mining round further comprises:
organizing, the blocks to be mined according to their capacity consumption, starting from the lowest consumption to the highest consumption block until the capacity of the node is reached.

7. The method according to claim 6, wherein the mining process starts with the block to be mined with a lowest consumption of capacity and/or the block which is most critical in terms of time.

8. The method of claim 1, wherein the method also comprises:
receiving, by the one or more node, a success message from another node and stopping the current mining process.

9. The method of claim 1, wherein the mining round comprises a plurality of mining processes.

10. The method of claim 1, wherein one mining round lasts at least 5 minutes, at least 10 minutes or at least 20 minutes.

11. The method of claim 1, wherein the blockchain comprises at least one virtual chain, wherein at least two blocks of the blockchain are connected to each other based on their context.

12. The method of claim 1, wherein the consensus algorithms is one or more of proof of authority, proof of stake, delegated proof of stake, leased proof of stake, proof of elapsed time, practical Byzantine fault tolerance, simplified Byzantine fault tolerance, delegated Byzantine fault tolerance, directed acyclic graphs, proof of activity, proof of importance, proof of capacity, proof of burn, multi-signature, multisig, and/or proof of weight.

13. A system for parallel multi-block mining by a single node, in a single round under different consensus schemes, wherein the system comprises:
at least one node comprising a processor connected to a non-transitory computer readable medium, the at least one node configured to:
collect in a blockchain network transactions which wait in a mempool or memory pool, and which need to be added to a block in a mining round,
cluster the transactions to be mined based on their context in one or more context-related transactions,
search the blockchains to find similar transactions based on the context,
select an appropriate consensus algorithm based on the context of similar previous mined transactions, wherein the similar previous mined transactions are transactions that meet a pre-selected criteria of similarity for the previous mined transactions,
create corresponding relations between the blocks with similar previous mined transactions and the one or more cluster of context-related transactions to be mined,
identify the consensus algorithm that were selected for said similar previous mined transactions,
organize the transactions to be mined in different blocks, one of said blocks comprising one of said one or more cluster and select the consensus algorithm for each of these blocks based on the identification in the previous step,
compute a node capacity on how many blocks of said different blocks could be mined in the mining round based on the different blocks and their selected consensus algorithm,
start the mining round with a first mining process for a first of said different blocks with the consensus algorithm selected for said first block, and
solve the first block.

14. The system according to claim 13, wherein:
wherein the at least one node includes a plurality of nodes connected to each other within the blockchain network, and the system also comprises:
one or more nodes capable to perform the block generating process for one or more transactions;
a chain of blocks in a specific order,
one or more consensus algorithm,
one or more validator node, and
a blockchain ecosystem.

15. The system according to claim 13, wherein the system further comprises one or more virtual chain which is chained based on its context and is encapsulated in the chain.

\* \* \* \* \*